(12) United States Patent
Kim et al.

(10) Patent No.: US 8,934,838 B2
(45) Date of Patent: Jan. 13, 2015

(54) RECOMMENDER SYSTEM/METHOD, SERVICE SERVER, TERMINALS, CONNECTION METHOD AND STORAGE MEDIA FOR EFFICIENT CONNECTION

(75) Inventors: In Hwan Kim, Seoul (KR); Jeong Hoon Lee, Seoul (KR); Jeong Min You, Seoul (KR)

(73) Assignee: SK Planet Co., Ltd (KR)

( * ) Notice: Subject to any disclaimer, the term of this patent is extended or adjusted under 35 U.S.C. 154(b) by 653 days.

(21) Appl. No.: 13/126,637

(22) PCT Filed: Oct. 28, 2009

(86) PCT No.: PCT/KR2009/006246
§ 371 (c)(1),
(2), (4) Date: Apr. 28, 2011

(87) PCT Pub. No.: WO2010/050739
PCT Pub. Date: May 6, 2010

(65) Prior Publication Data
US 2011/0207407 A1 Aug. 25, 2011

(30) Foreign Application Priority Data
Oct. 28, 2008 (KR) .................. 10-2008-0105769

(51) Int. Cl.
*H04W 48/00* (2009.01)
*H04W 8/22* (2009.01)
(Continued)

(52) U.S. Cl.
CPC ............... *H04W 8/22* (2013.01); *H04L 12/14* (2013.01); *H04L 12/145* (2013.01); *H04M 15/00* (2013.01); *H04M 15/8044* (2013.01); *H04M 15/8055* (2013.01); *H04M 15/8061* (2013.01); *H04W 48/18* (2013.01); *H04W 76/023* (2013.01); *H04W 88/04* (2013.01)
USPC ....... 455/41.2; 455/41.1; 455/41.3; 455/11.1; 455/15; 455/3.01; 455/3.04

(58) Field of Classification Search
CPC .................................................. H04W 4/008
USPC .............. 455/41.1, 41.2, 41.3, 11.1, 15, 3.01, 455/3.04
See application file for complete search history.

(56) References Cited

U.S. PATENT DOCUMENTS 7,428,217 B2 * 9/2008 Kobayashi et al. ........... 370/235
7,515,872 B2 * 4/2009 Hundscheidt et al. ....... 455/3.01
(Continued)

FOREIGN PATENT DOCUMENTS

JP        06-222860        8/1994
JP        3039178          3/2000
(Continued)

*Primary Examiner* — Wen Huang
(74) *Attorney, Agent, or Firm* — Baker Hostetler LLP

(57) ABSTRACT

The present invention relates to a system, a method, a service server, an end-point terminal, a connection method and storage media for recommending an efficient connection path, in which if an end-point terminal connected to a mobile communication terminal through a short-range communication network can be connected to a service server through two or more mobile communication terminals, the end-point terminal can use a service through a mobile communication terminal capable of providing an optimum connection. The recommending system according to the present invention comprises: an end-point terminal connected to a mobile communication terminal through a short-range communication network, for playing back contents requested and received from an application server; the mobile communication terminal connected to the end-point terminal through the short-range communication network and connected to a service server through a mobile communication network, for transferring data between the end-point terminal and the service server; and the service server connected to the mobile communication terminal through the mobile communication network and connected to the application server through either the mobile communication network or a wired communication network, for providing the end-point terminal with information on a mobile communication terminal capable of providing an optimum connection, by examining a connection history between the end-point terminal and the mobile communication terminal or based on hardware specifications of mobile communication terminals connectible to the end-point terminal.

26 Claims, 7 Drawing Sheets

(51) Int. Cl.
  *H04L 12/14* (2006.01)
  *H04M 15/00* (2006.01)
  *H04W 48/18* (2009.01)
  *H04W 76/02* (2009.01)
  *H04W 88/04* (2009.01)

(56) References Cited

U.S. PATENT DOCUMENTS

| | | | |
|---|---|---|---|
| 7,610,049 B2 * | 10/2009 | Watanabe | 455/436 |
| 8,055,187 B2 * | 11/2011 | Tanabe | 455/3.05 |
| 2003/0220121 A1 * | 11/2003 | Konishi et al. | 455/519 |
| 2004/0185777 A1 * | 9/2004 | Bryson | 455/41.1 |
| 2004/0185851 A1 * | 9/2004 | Nagai | 455/436 |
| 2008/0081558 A1 * | 4/2008 | Dunko et al. | 455/41.1 |
| 2008/0300931 A1 * | 12/2008 | Dawson et al. | 705/7 |
| 2009/0156123 A1 * | 6/2009 | Kim | 455/41.2 |

FOREIGN PATENT DOCUMENTS

| | | |
|---|---|---|
| JP | 2002-305609 | 10/2002 |
| JP | 2006-262379 | 9/2006 |
| KR | 1020060069053 | 6/2006 |

* cited by examiner

RECOMMENDER SYSTEM/METHOD, SERVICE SERVER, TERMINALS, CONNECTION METHOD AND STORAGE MEDIA FOR EFFICIENT CONNECTION

BACKGROUND OF THE INVENTION

1. Field of the Invention

The present invention relates to a system, a method, a service server, an end-point terminal, a connection method and storage media for recommending an efficient connection path, and more specifically, to techniques for recommending an efficient connection path, in which if an end-point terminal connected to a mobile communication terminal through a short-range communication network can be connected to a service server through two or more mobile communication terminals, the end-point terminal can use a service through a mobile communication terminal capable of providing an optimum connection.

2. Background of the Related Art

With the advancement of information communication technologies, a variety of end-point terminals that can play back documents, images and moving pictures (hereinafter, 'documents, images and moving pictures' will be simply referred to as 'contents' for the convenience of explanation, unless otherwise specified), such as MPeg audio layer-3 (MP3) players, Personal Multimedia Players (PMP) and Ultra Mobile Personal Computers (UMPC), is widely used. A user downloads desired contents from personal computers (PC) and plays back the downloaded contents. However, there is a problem in that the user cannot download desired contents when the user is moving or cannot connect to a PC.

In order to solve the problem, proposed are techniques for adding a communication means connectible to a short-range communication network onto an end-point terminal, such as a Bluetooth or an ultra-wideband (UWB), and connecting the end-point terminals to a mobile communication terminal through the short-range communication network. On the other hand, if there is a plurality of mobile communication terminals connectible to the end-point terminal, the end-point terminal should select one of the mobile communication terminals. In this case, since the end-point terminal cannot easily grasp hardware specifications and transmission qualities of the mobile communication terminals, the end-point terminal simply connects to and uses a mobile communication terminal that has a good connection state or is initially connected. At this point, if hardware specifications of the mobile communication terminal are too low or data transmission cost is too high, proper services cannot be provided.

SUMMARY OF THE INVENTION

Therefore, the present invention has been made in view of the above problems, and it is an object of the invention to provide a technique for selecting and connecting to a mobile communication terminal that has an optimum connection quality.

To accomplish the above object, according to one aspect of the present invention, there is provided a system for recommending an efficient connection path, the system comprising: an end-point terminal connected to a mobile communication terminal through a short-range communication network, for playing back contents requested and received from an application server; the mobile communication terminal connected to the end-point terminal through the short-range communication network and connected to a service server through a mobile communication network, for transferring data between the end-point terminal and the service server; and the service server connected to the mobile communication terminal through the mobile communication network and connected to the application server through either the mobile communication network or a wired communication network, for providing the end-point terminal with information on a mobile communication terminal capable of providing an optimum connection, by examining a connection history between the end-point terminal and the mobile communication terminal or based on hardware specifications of mobile communication terminals connectible to the end-point terminal.

In the embodiment, the system may further comprise the application server connected to the service server through either the mobile or wired communication network, for providing the contents requested by the end-point terminal.

In the embodiment, the system may further comprise a billing server connected to the service server through either the mobile or wired communication network, for performing a billing process for the mobile communication terminal when the contents are provided to the end-point terminal from the application server.

To accomplish the above object, according to another aspect of the present invention, there is provided a method for recommending an efficient connection path, performed by a system in which an end-point terminal can be connected to a plurality of mobile communication terminals through a short-range communication network, and the mobile communication terminals can be connected to a service server through a mobile communication network, the method comprising the steps of: connecting to the service server through any one of the mobile communication terminals, by the end-point terminal; examining if there is a connection history between the end-point terminal and the mobile communication terminal, by the service server; and comparing connection qualities of a currently connected mobile communication terminal and mobile communication terminals having a connection history, recommending a mobile communication terminal having an optimum connection quality, and notifying the end-point terminal of the recommended mobile communication terminal, by the service server, if there is a connection history in the examination of connection history.

In the embodiment, comparing connection qualities may be comparing data including a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

In the embodiment, comparing connection qualities may be comparing the data by assigning a weighting factor to each of the data.

In the embodiment, comparing connection qualities may be comparing data transmission prices.

In the embodiment, the method may further comprise the steps of: examining if there is a mobile communication terminal connectible to the end-point terminal, other than the currently connected mobile communication terminal, by the service server, if there is no connection history in the examination of connection history; and moving a processing flow to the step of comparing connection qualities of the currently connected mobile communication terminal and mobile communication terminals having a connection history, recommending a mobile communication terminal having an optimum connection quality, and notifying the end-point terminal of the recommended mobile communication terminal, by the service server, if there is a connectible mobile communication terminal in the examination of connectible mobile communication terminal.

In the embodiment, the method may further comprise the step of maintaining the current connection by the end-point terminal, if there is no connectible mobile communication terminal in the examination of connectible mobile communication terminal.

In the embodiment, the method may further comprise the steps of: determining whether or not to connect to the mobile communication terminal recommended by the service server, by the end-point terminal; connecting to the recommended mobile communication terminal by the end-point terminal, if the end-point terminal determines to connect to the recommended mobile communication terminal in the determination; and storing a connection history by the service server.

In the embodiment, the method may further comprise the step of maintaining the current connection and storing a connection history by the end-point terminal, if the end-point terminal determines not to connect to the recommended mobile communication terminal in the determination.

In the embodiment, the connection history may include a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

In the embodiment, the connection history may further include a data transmission price.

To accomplish the above object, according to still another aspect of the present invention, there is provided a service server for recommending an efficient connection path, the service server comprising: a communication unit for transmitting and receiving data through a mobile communication network; a mobile communication terminal management unit for managing information on a mobile communication terminal received through the communication unit; an end-point terminal management unit for managing information on an end-point terminal received through the communication unit; a short-range communication network management unit for managing information on a short-range communication network that relays communications between the mobile communication terminal and the end-point terminal; a storage unit for storing the mobile communication terminal information, the end-point terminal information, the short-range communication network information, and a connection history between the end-point terminal and the mobile communication terminal; and a control unit for controlling operations of each constitutional component, recommending a mobile communication terminal having an optimum connection quality among all mobile communication terminals currently connectible to the end-point terminal and informing the end-point terminal of the recommended mobile communication terminal through the communication unit, and controlling the communication unit to transfer contents received from an application server to the mobile communication terminal.

In the embodiment, the connection history may include a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

In the embodiment, the connection history may further include a data transmission price.

In the embodiment, the control unit may recommend a mobile communication terminal having an optimum connection quality by comparing a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

In the embodiment, the control unit may compare the data by assigning a weighting factor to each of the data.

In the embodiment, the control unit may additionally recommend a mobile communication terminal having a lowest data transmission price.

To accomplish the above object, according to still another aspect of the present invention, there is provided a method for recommending an efficient connection path by a service server, the method comprising the steps of: connecting to the service server via a mobile communication terminal by an end-point terminal; examining if there is a connection history between the end-point terminal and the mobile communication terminal; fetching the connection history, if there is a connection history in the examination of connection history; and comparing connection qualities of mobile communication terminals having a connection history among mobile communication terminals connectible to the end-point terminal, recommending a mobile communication terminal having an optimum connection quality, and notifying the end-point terminal of the recommended mobile communication terminal.

In the embodiment, comparing connection qualities may be comparing data including a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

In the embodiment, comparing connection qualities may be comparing the data by assigning a weighting factor to each of the data.

In the embodiment, comparing connection qualities may be comparing data transmission prices.

In the embodiment, the method may further comprise the steps of: examining if there is a mobile communication terminal connectible to the end-point terminal, other than a currently connected mobile communication terminal, if there is no connection history in the examination of connection history; and moving a processing flow to the step of comparing connection qualities of the currently connected mobile communication terminal and mobile communication terminals having a connection history, recommending a mobile communication terminal having an optimum connection quality, and notifying the end-point terminal of the recommended mobile communication terminal, if there is a connectible mobile communication terminal in the examination of connectible mobile communication terminal.

In the embodiment, the method may further comprise the step of maintaining the current connection by the end-point terminal, if there is no connectible mobile communication terminal in the examination of connectible mobile communication terminal.

In the embodiment, the method may further comprise the steps of: determining whether or not to connect to the mobile communication terminal recommended by the service server, by the end-point terminal; connecting to the recommended mobile communication terminal by the end-point terminal, if the end-point terminal determines to connect to the recommended mobile communication terminal in the determination; and storing a connection history by the service server.

In the embodiment, the method may further comprise the step of maintaining the current connection and storing a connection history by the end-point terminal, if the end-point terminal determines not to connect to the recommended mobile communication terminal in the determination.

In the embodiment, the connection history may include a processing speed of the control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

In the embodiment, the connection history may include a data transmission price.

To accomplish the above object, according to still another aspect of the present invention, there is provided a storage medium for storing the method for recommending an efficient connection by a service server described above as a program.

To accomplish the above object, according to still another aspect of the present invention, there is provided an end-point terminal connecting to an efficient connection path, the end-point terminal comprising: an input unit for receiving a user command; a communication unit for transmitting and receiving data through a short-range communication network; a playback unit for playing back contents; and a control unit for controlling operations of each constitutional component, controlling the communication unit to transmit a contents request signal to a mobile communication terminal and receive the contents from the mobile communication terminal, and changing a mobile communication terminal to be connected depending on the user command inputted through the input unit when information on a mobile communication terminal recommended by a service server is received.

To accomplish the above object, according to still another aspect of the present invention, there is provided a method for connecting to an efficient connection path by an end-point terminal, the method comprising the steps of: connecting the end-point terminal to a service server through a short-range communication network via a mobile communication terminal; receiving a recommended connection path from the service server; determining whether or not to change a connection path; and releasing current connection, and changing the connection path to a mobile communication terminal corresponding to the recommended connection path, if it is determined to change a connection path in the determination.

In the embodiment, the method may further comprise the step of maintaining the current connection, if it is determined not to change a connection path in the determination.

To accomplish the above object, according to still another aspect of the present invention, there is provided a storage medium for storing the method for connecting to an efficient connection path by an end-point terminal described above as a program.

DETAILED DESCRIPTION OF THE PREFERRED EMBODIMENT

Figure 1:
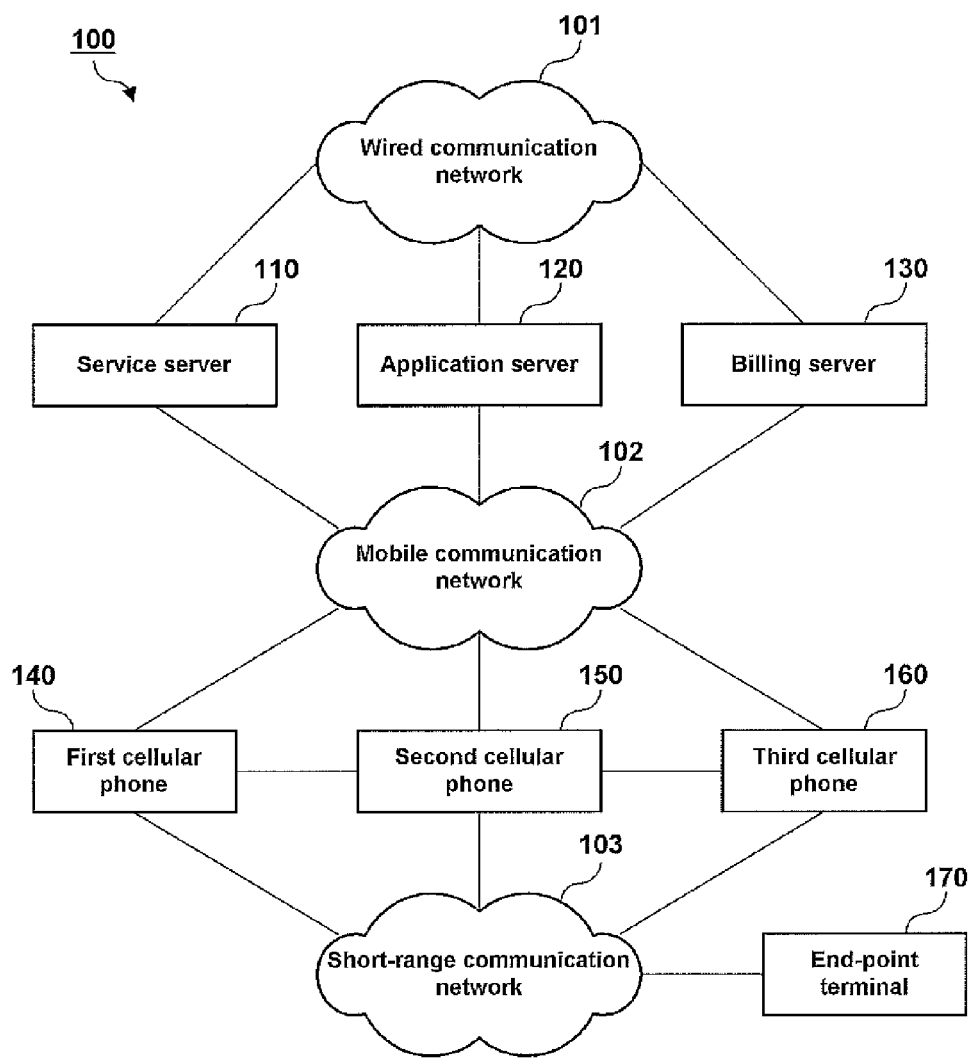
FIG. 1 is a block diagram showing a recommending system according to an embodiment of the present invention.

The preferred embodiments of the invention will be hereafter described in detail, with reference to the accompanying drawings.

The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

First, a system for recommending an efficient connection path according to an embodiment of the invention will be described with reference to FIGS. 1, 3 and 8.

Figure 3:
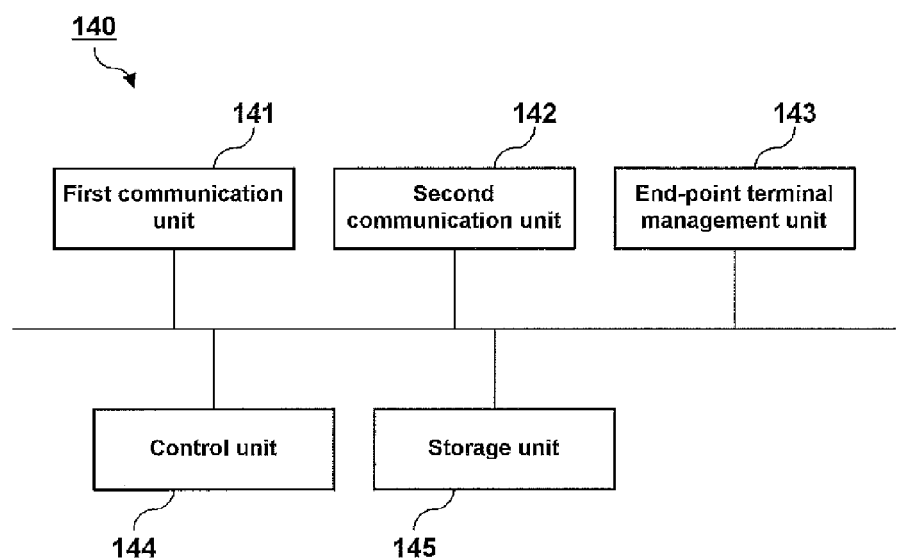
FIG. 3 is a detailed block diagram showing a first mobile communication terminal in FIG. 1.
Figure 8:
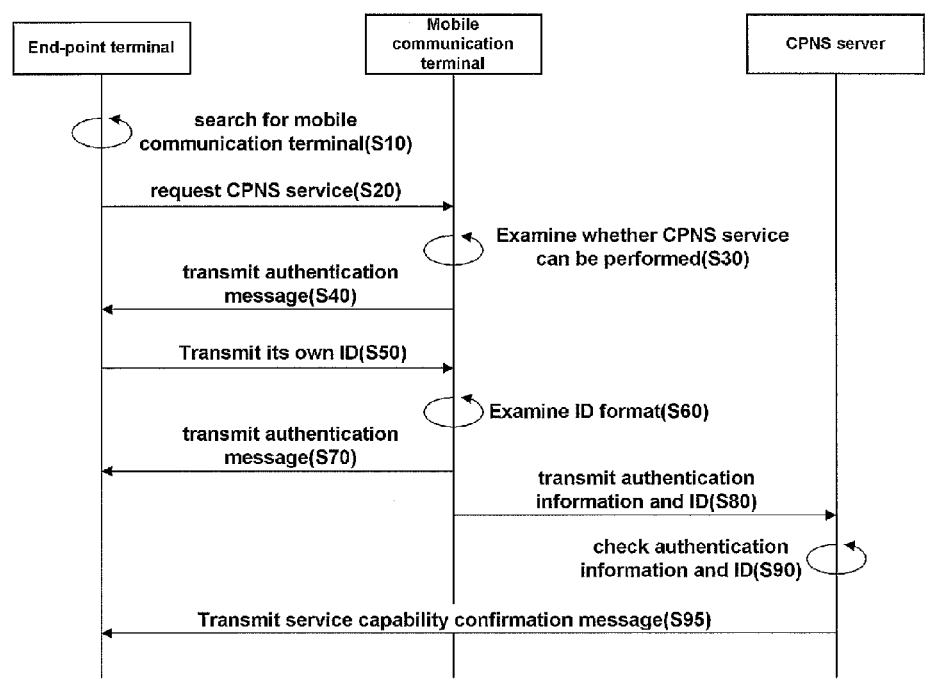
FIG. 8 is a sequence diagram illustrating an initial setup procedure for the present invention.

FIG. 1 is a block diagram showing a recommending system according to an embodiment of the present invention, FIG. 3 is a detailed block diagram showing a first mobile communication terminal in FIG. 1, and FIG. 8 is a sequence diagram illustrating an initial setup procedure for the present invention.

As shown FIG. 1, a system for recommending an efficient connection path 100 according to the embodiment (hereinafter, 'a system for recommending an efficient connection path' will be simply referred to as 'a recommending system' for the convenience of explanation, unless otherwise specified) is configured to connect a service server 110, an application server 120 and a billing server 130 with one another through a wired communication network 101 and/or a mobile communication network 102, in which the service server 110 is connected to mobile communication terminals 140, 150 and 160 through the mobile communication network 102, and the mobile communication terminals 140, 150 and 160 are connected to an end-point terminal 170 through a short-range communication network 103. The short-range communication network 103 used in this system can be a wireless LAN, a Bluetooth, a UWB, or the like. In addition, the application server 120 and/or the billing server 130 can be included in the service server 110 as a constitutional component.

Here, the recommending system 100 goes through an initial setup procedure shown in FIG. 8 to recommend an efficient connection path.

As a first step, the end-point terminal 170 searches for a mobile communication terminal that will function as a gateway connected to the service server 110, in order to use a service S10.

As a second step, the end-point terminal 170 requests a service from the mobile communication terminal searched in the first step. At this point, the end-point terminal also transmits account information and the like needed for using the service S20.

As a third step, if the mobile communication terminal receives a service request transmitted from the end-point terminal, the mobile communication terminal examines whether or not the end-point terminal 170 can perform the service S30.

As a fourth step, if the end-point terminal 170 can perform the service in the examination of the third step, the mobile communication terminal transmits an authentication message informing that the end-point terminal can perform the service to the end-point terminal 170 S40. On the other hand, if the end-point terminal cannot perform the service in the examination of the third step, the mobile communication terminal transmits a message informing that the end-point terminal cannot perform the service to the end-point terminal and terminates the process.

As a fifth step, the end-point terminal 170 transmits its account information (ID) S50.

As a sixth step, the mobile communication terminal examines whether or not the format of the account information transmitted from the end-point terminal 170 matches to an account information format issued by the service server, and if the account information formats are matched, the mobile communication terminal transmits an authentication message informing approval of the service to the end-point terminal 170 S60 and S70. If the account information formats are not matched, the mobile communication terminal transmits a message informing disapproval of the service to the end-point terminal and terminates the process.

As a seventh step, the mobile communication terminal transmits authentication information and account information of its own and the end-point terminal 170 to the service server 110 S80.

As an eighth step, the service server 110 examines the account information and determines whether or not the service can be provided S90.

As a ninth step, if the service can be provided for both of the mobile communication terminal and the end-point terminal 170, the service server 110 informs the end-point terminal that the service can be provided so that the end-point terminal may use the service S95.

The end-point terminal 170 requests and receives contents from the application server 120 and plays back the received contents. The end-point terminal 170 can be an MP3 player, a PMP, a UMPC or the like having a communication unit for connecting to the short-range communication network 103.

The mobile communication terminals 140, 150 and 160 transfer data between the end-point terminal 170 and the service server 110. Describing the configuration of the mobile communication terminal 140 with reference to FIG. 3, a first communication unit 141 transmits and receives data through the mobile communication network 102. A second communication unit 142 transmits and receives data through the short-range communication network 103. In order to accept various types of short-range communication networks, the second communication unit 142 can accommodate two or more short-range communication specifications. An end-point terminal management unit 143 stores information on the end-point terminal. A control unit 144 controls operations of each constitutional component. A storage unit 145 stores information on the end-point terminal.

The service server 110 provides the end-point terminal 170 with information on a mobile communication terminal capable of providing an optimum connection, based on connection histories or hardware specifications of the mobile communication terminals 140, 150 and 160 connectible to the end-point terminal 170. That is, if the end-point terminal 170 has a history of connecting to a specific mobile communication terminal, the service server 110 may provide information on the mobile communication terminal considering optimum speed or efficiency based on the history. If the end-point terminal 170 does not have such a history, the service server 110 may recommend an optimum mobile communication terminal by comparing hardware specifications of the mobile communication terminals since the hardware specifications are an important factor for an optimum connection. To this end, the service server 110 stores information on the hardware specifications of the end-point terminal 170 and the mobile communication terminals 140, 150 and 160. If there is a connection history between the end-point terminal and a specific mobile communication terminal, the service server 110 also stores the history information.

The application server 120 provides contents requested by the end-point terminal 170.

The billing server 130 performs a billing process for the mobile communication terminal when the end-point terminal 170 is provided with the contents from the application server 120.

Hereinafter, a method for recommending an efficient connection path according to an embodiment of the invention will be described with reference to FIG. 5.

Figure 5:
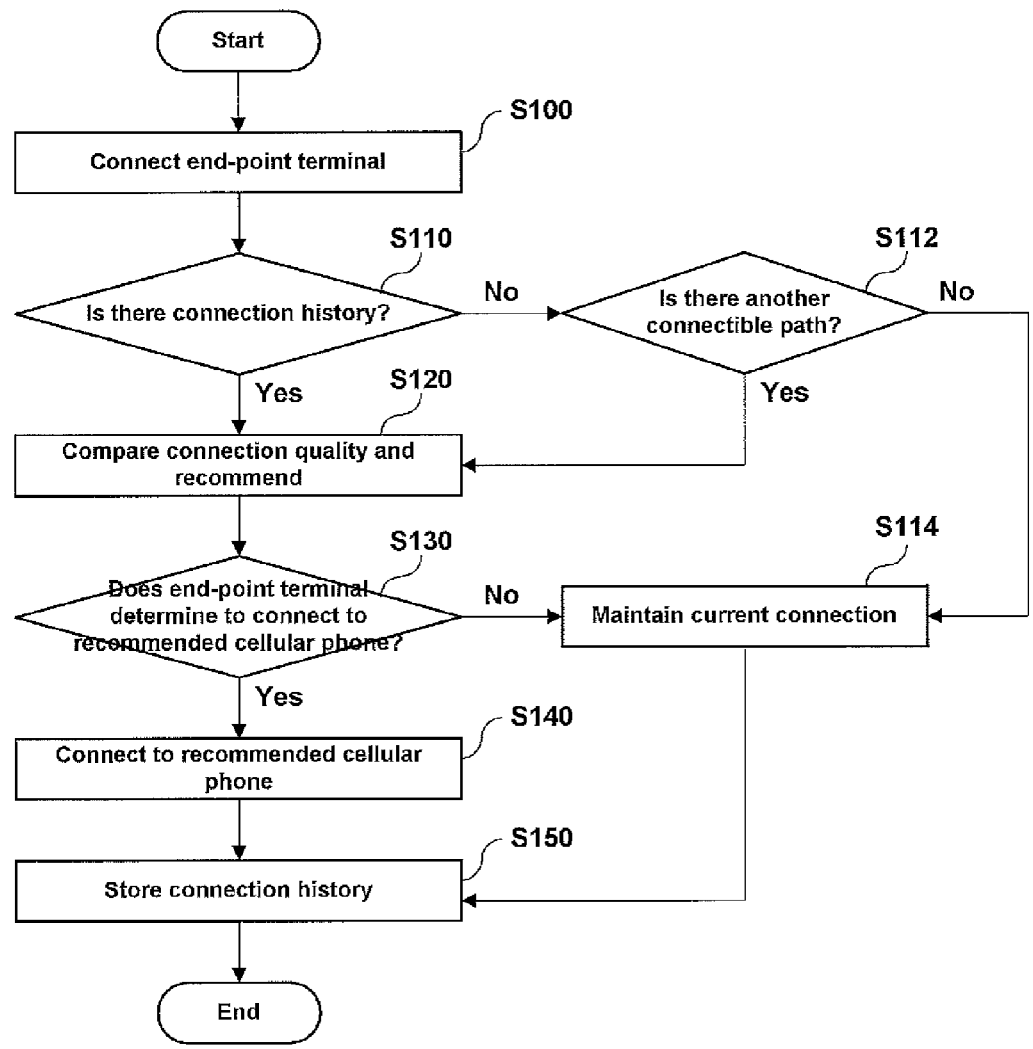
FIG. 5 is a flowchart illustrating a recommending method according to an embodiment of the present invention.

FIG. 5 is a flowchart illustrating a recommending method according to an embodiment of the present invention.

As shown in FIG. 5, a method for recommending an efficient connection path according to the embodiment (hereinafter, 'a method for recommending an efficient connection path' will be simply referred to as 'a recommending method' for the convenience of explanation, unless otherwise specified) is applied to a system in which an end-point terminal can be connected to a plurality of mobile communication terminals through a short-range communication network, and the mobile communication terminals can be connected to a service server.

As a first step, the end-point terminal connects to the service server through any one of the mobile communication terminals S100.

As a second step, the service server examines if there is a connection history between the end-point terminal and the mobile communication terminal S110. The connection history used in this step preferably includes information on a connection state, a processing speed of the control unit of the mobile communication terminal, an occupancy rate of the control unit of the mobile communication terminal used by the control unit of the mobile communication terminal for the connection between the end-point terminal and the service server, a data transfer speed between the end-point terminal and the service server, a data transfer failure rate between the end-point terminal and the service server, and a data transmission price, at the time of connection if the end-point terminal has ever been connected to the mobile communication terminal. For example, the connection history can be configured with the information shown in table 1.

TABLE 1

| Cellular phone 1 | Contents | Weighting factor | Points | Cellular phone 2 | Contents | Weighting factor | Points |
|---|---|---|---|---|---|---|---|
| Connection history | Transmission speed = 5 Mbps | 2 | 88 | Connection history | Transmission speed = Unknown | 2 | Unknown |
| | Data transfer failure rate = 1.25% | 1.2 | | | Data transfer failure rate = Unknown | 1.2 | |
| | Price = 2.5 Won/Packet | 1.8 | | | Price = Unknown | 1.8 | |
| Hardware specifications | Processing speed = 660 MHz | 1.9 | 83 | Hardware specifications | Processing speed = 720 MHz | 1.9 | 85 |
| | Occupancy rate = 35% | 1.7 | | | Occupancy rate = 22% | 1.7 | |
| | Communication speed = 10 Mb/s | 2 | | | Communication speed = 10 Mb/s | 2 | |
| | Data transfer failure rate = 1.22% | 1.2 | | | Data transfer failure rate = 1.25% | 1.2 | |
| | Price = 2.5 Won/Packet | 1.8 | | | Price = 2.5 Won/Packet | 1.8 | |
| | Transmission speed = 5 Mb/s | 1.3 | | | Transmission speed = 5 Mb/s | 1.3 | |

As is understood from table 1, mobile communication terminal 1 has a connection history of connecting to the end-point terminal and marks 88 points, and mobile communication terminal 2 has no connection history. In addition, it is understood that mobile communication terminal 1 has a hardware specification point of 83, whereas mobile communication terminal 2 marks 85 points. These points can be calculated considering connection history items and weighting factors assigned to the items, and it is notable that the calculating method can be changed or modified depending on the circumstances. When a user desires to select a connection path only based on hardware specifications, mobile communication terminal 2 can be connected to the end-point terminal, and if the user desires to select a connection path considering both the connection history and the hardware specifications, mobile communication terminal 1 can be connected to the end-point terminal.

As a third step, if there is a connection history in the examination of connection history, the service server compares connection qualities of the currently connected mobile communication terminal and mobile communication terminals having a connection history, recommends a mobile communication terminal having an optimum connection quality, and notifies the end-point terminal of the recommended mobile communication terminal S120. Here, the connection qualities are compared by comparing data included in the connection history. At this point, it is preferable to assign a weighting factor to each of the data. The weighting factor can be adjusted diversely depending on a contents type, a time zone of using contents, and a contents size. In addition, a mobile communication terminal having an optimum connection quality and a mobile communication terminal having the lowest data transmission price can be recommended in plurality as a recommended mobile communication terminal. For example, if the user desires to use contents for which a data transmission speed is important (traffic information, bidding in an auction, etc), the user will connect to the mobile communication terminal having an optimum connection quality, and if the user desires to use contents for which a data transmission price is important, the user will connect to the mobile communication terminal having the lowest data transmission price.

As a fourth step, if there is no connection history in the examination of connection history, the service server examines if there is a mobile communication terminal connectible to the end-point terminal, other than the currently connected mobile communication terminal S112.

As a fifth step, if there is a connectible mobile communication terminal in the fourth step, the processing flow moves to step S120 in which the service server compares connection qualities the currently connected mobile communication terminal and mobile communication terminals having a connection history, recommends a mobile communication terminal having an optimum connection quality, and notifies the end-point terminal of the recommended mobile communication terminal.

As a sixth step, if there is no connectible mobile communication terminal in the fourth step, the end-point terminal maintains the current connection S114.

As a seventh step, the end-point terminal determines whether or not to connect to the mobile communication terminal recommended by the service server S130. This step is needed since there are some occasions when the user does not desire to connect the end-point terminal to the recommended mobile communication terminal if there is no or only a small difference between the qualities or prices of the recommended mobile communication terminal and the currently connected mobile communication terminal.

As an eighth step, if the end-point terminal determines to connect to the recommended mobile communication terminal in the seventh step, the end-point terminal connects to the recommended mobile communication terminal S140. At this point, it is notable that the end-point terminal performs the eighth step after releasing the connection to the mobile communication terminal established in the first step.

As a ninth step, the service server stores a connection history S150. The connection history stored in this step will be used for recommendation at a later time.

As a tenth step, if the end-point terminal determines not to connect to the recommended mobile communication terminal in the seventh step, the end-point terminal maintains the current connection, and the service server stores a connection history S114.

After performing the steps described above, the end-point terminal receives contents from the application server and plays back the contents, and the billing server perform a billing process for the mobile communication terminal used for the connection. Since these steps are apparent to those skilled in the art, details thereof will be omitted. In addition, an authentication step can be performed for the connections among the end-point terminal, the mobile communication terminals, and the service server, and this step is also apparent to those skilled in the art that details thereof will be omitted.

Hereinafter, a service serve for recommending an efficient connection path according to an embodiment of the invention will be described with reference to FIG. 2.

Figure 2:
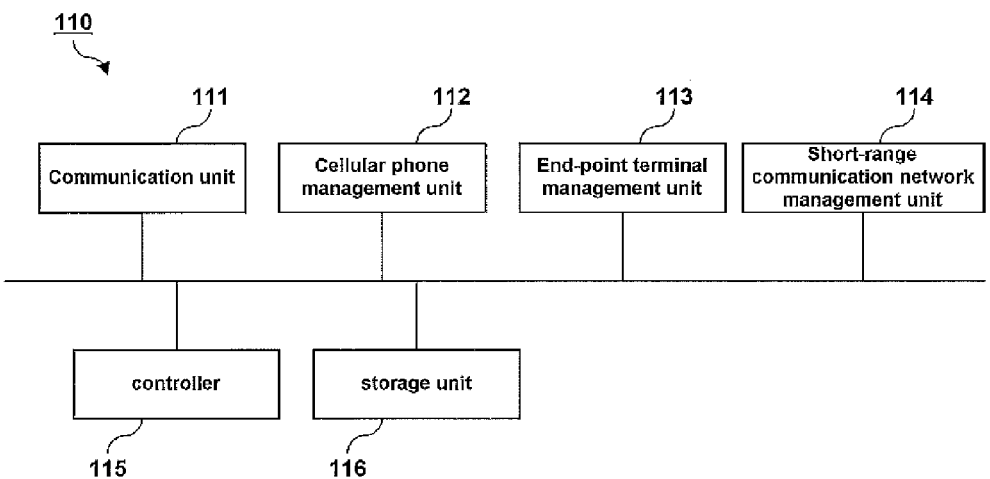
FIG. 2 is a detailed block diagram showing a service server in FIG. 1.

FIG. 2 is a detailed block diagram showing a service server in FIG. 1.

As shown in FIG. 2, in a service serve for recommending an efficient connection path 110 according to the embodiment (hereinafter, 'a service serve for recommending an efficient connection path' will be simply referred to as 'a service server' for the convenience of explanation, unless otherwise specified), a communication unit 111 transmits and receives data through a mobile communication network.

A mobile communication terminal management unit 112 manages information on the mobile communication terminal received through the communication unit 111. The managed mobile communication terminal information may include a mobile communication terminal type, hardware specifications, information on the mobile communication terminal user, usage rates, and the like.

An end-point terminal management unit 113 manages information on the end-point terminal received through the communication unit 111. The managed end-point terminal information may include an end-point terminal type, hardware specifications, a unique account of the end-point terminal and the like.

A short-range communication network management unit 114 manages information on the short-range communication network that relays communications between the mobile communication terminal and the end-point terminal. The managed short-range communication network information may include specifications of the short-range communication network, a log-in account if log-in is required, and the like.

A storage unit 116 stores the mobile communication terminal information, the end-point terminal information, the short-range communication network information, and a connection history between the end-point terminal and the mobile communication terminal. The connection history stored in this step can be the same as the connection history used for the recommending system described above.

A control unit 115 controls operations of each constitutional component, recommends a mobile communication terminal having an optimum connection quality among all the mobile communication terminals currently connectible to the end-point terminal and informs the end-point terminal of the recommended mobile communication terminal through the communication unit 111, and controls the communication unit 111 to transfer the contents received from the application server to the mobile communication terminal. The control unit 115 preferably compares connection qualities by assigning a weighting factor to each of data constituting the connection history.

Hereinafter, a method for recommending an efficient connection path by a service server according to an embodiment of the invention will be described with reference to FIG. 6.

Figure 6:
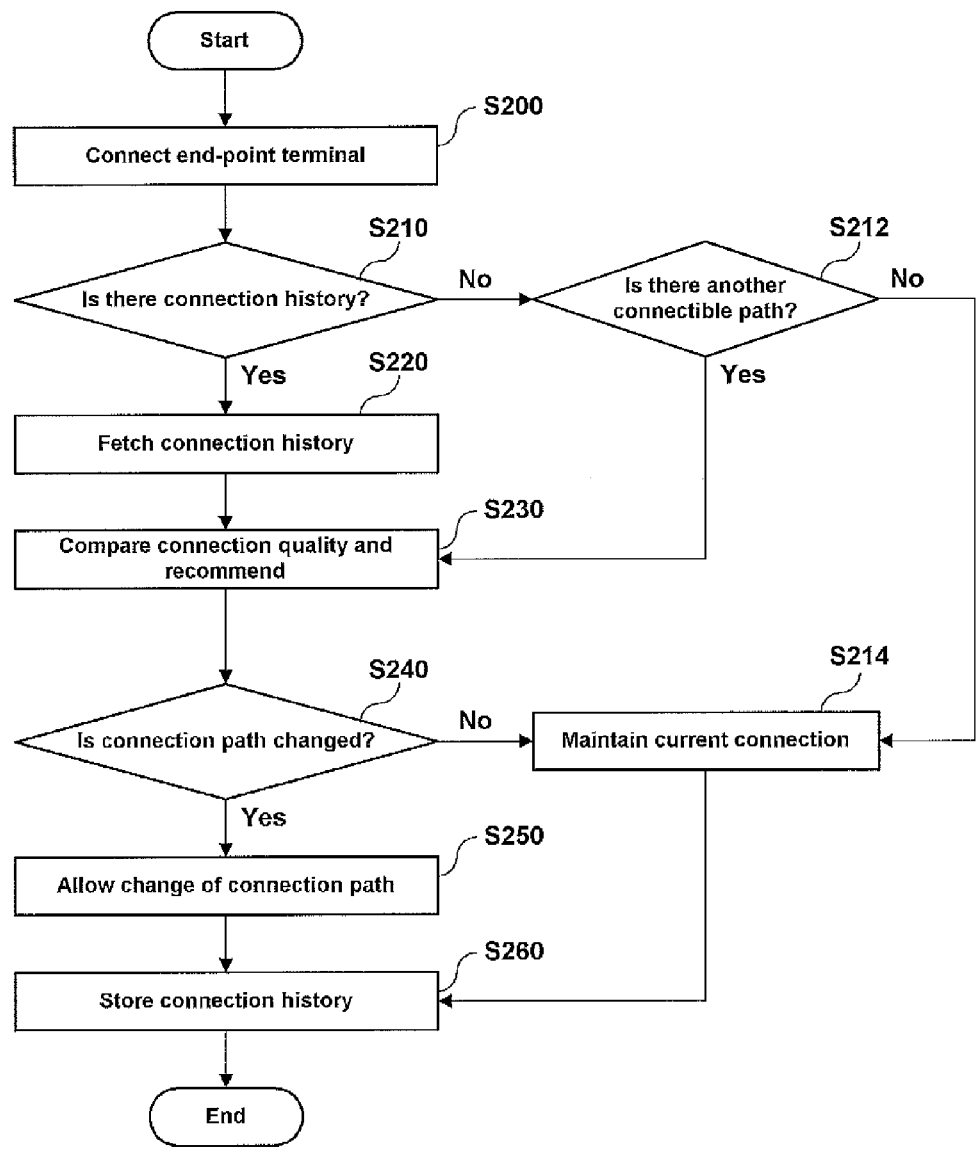
FIG. 6 is a flowchart illustrating a recommending method performed by a service server according to an embodiment of the present invention.

FIG. 6 is a flowchart illustrating a recommending method performed by a service server according to an embodiment of the present invention.

As shown in FIG. 6, in a method for recommending an efficient connection path by a service server according to the embodiment (hereinafter, 'a method for recommending an efficient connection path by a service server' will be simply referred to as 'a recommending method by a service server' for the convenience of explanation, unless otherwise specified), the service server allows connection of an end-point terminal via a mobile communication terminal S200, as a first step.

As a second step, the service server examines if there is a connection history between the end-point terminal and the mobile communication terminal S210.

As a third step, if there is a connection history in the examination of connection history, the service server examines fetches the connection history S220.

As a fourth step, the service server compares connection qualities of mobile communication terminals having a connection history among the mobile communication terminals connectible to the end-point terminal, recommends a mobile communication terminal having an optimum connection quality, and notifies the recommended mobile communication terminal to the end-point terminal S230. The connection qualities are compared by comparing data including a processing speed of the control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server. It is preferable to assign a weighting factor to each of the data. In addition, it is preferable to compare data transmission prices and recommend a mobile communication terminal having the lowest data transmission price, together with the mobile communication terminal having an optimum connection quality.

As a fifth step, if there is no connection history in the examination of connection history, the service server examines if there is a mobile communication terminal connectible to the end-point terminal, other than the currently connected mobile communication terminal S212.

As a sixth step, if there is a connectible mobile communication terminal in the fifth step, the processing flow moves to step S230 in which connection qualities of mobile communication terminals having a connection history among the mobile communication terminals connectible to the end-point terminal are compared, and a mobile communication terminal having an optimum connection quality is recommended and notified to the end-point terminal.

As a seventh step, if there is no connectible mobile communication terminal in the fifth step, the service server allows the end-point terminal to maintain the current connection S214.

As an eighth step, the end-point terminal determines whether or not to connect to the mobile communication terminal recommended by the service server S240.

As a ninth step, if the end-point terminal determines to connect to the recommended mobile communication terminal in the eighth step, the service server allows the end-point terminal to connect to the recommended mobile communication terminal S250.

As a tenth step, the service server stores connection history S260.

As an eleventh step, if the end-point terminal determines not to connect to the recommended mobile communication terminal in the eighth step, the service server allows the end-point terminal to maintain the current connection and stores a connection history S214 and S260.

On the other hand, the method for recommending an efficient connection path by a service server may be stored in a storage medium as a program.

Hereinafter, an end-point terminal connecting to an efficient connection path according to an embodiment of the invention will be described with reference to FIG. 4.

Figure 4:
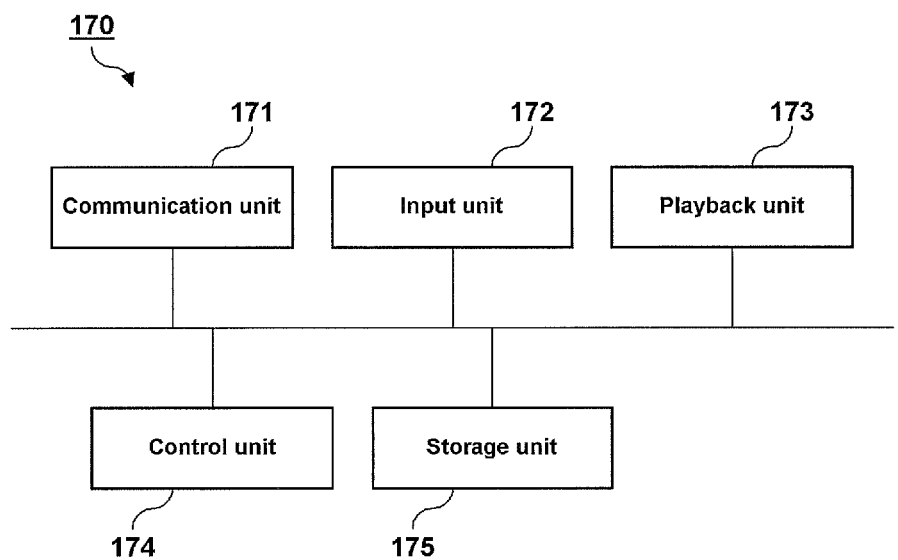
FIG. 4 is a detailed block diagram showing an end-point terminal in FIG. 1.

FIG. 4 is a detailed block diagram showing an end-point terminal in FIG. 1.

A shown in FIG. 4, in an end-point terminal connecting to an efficient connection path 170 according to the embodiment (hereinafter, 'an end-point terminal connecting to an efficient connection path' will be simply referred to as 'an end-point terminal' for the convenience of explanation, unless otherwise specified), an input unit 172 receives a user command. Input means such as a switch, a keypad, a keyboard, a touch screen and the like can be used as the input unit 172.

A communication unit 171 transmits and receives data through a short-range communication network.

A playback unit 173 plays back contents. The playback unit may include a codec processing unit, a sound processing unit and the like for playing back the contents.

A control unit 174 controls operations of each constitutional component, controls the communication unit 171 to transmit a contents request signal to the mobile communication terminal and receive contents from the mobile communication terminal. The control unit 174 changes a mobile communication terminal to be connected depending on the user command inputted through the input unit 172 when information on a mobile communication terminal recommended by the service server is received.

A storage unit 175 stores identification information of the end-point terminal, the received contents, and the like.

Hereinafter, a method for connecting to an efficient connection path by an end-point terminal according to an embodiment of the invention will be described with reference to FIG. 7.

Figure 7:
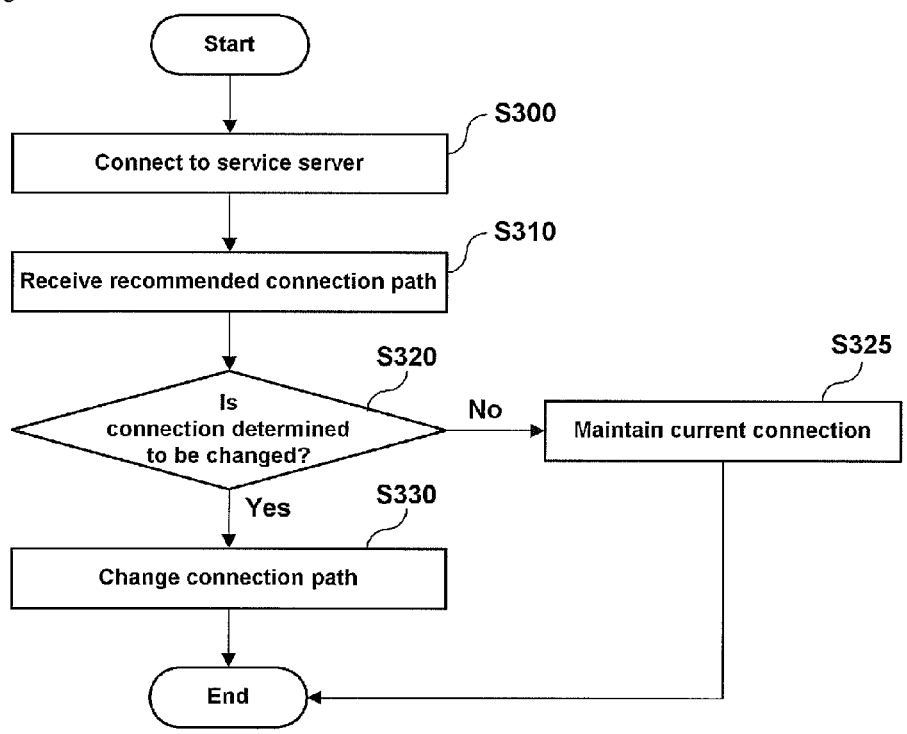
FIG. 7 is a flowchart illustrating a connection method according to an embodiment of the present invention.

FIG. 7 is a flowchart illustrating a connection method according to an embodiment of the present invention.

As shown in FIG. 7, in a method for connecting to an efficient connection path by an end-point terminal according to the embodiment (hereinafter, 'a method for connecting to an efficient connection path by an end-point terminal' will be simply referred to as 'a connection method' for the convenience of explanation, unless otherwise specified), the end-point terminal connects to the service server using a short-range communication network via a mobile communication terminal, as a first step S300.

As a second step, the end-point terminal receives a recommended connection path from the service server S310. The recommended connection path may include a connection path to a mobile communication terminal having optimum connection efficiency, a connection path to a mobile communication terminal having the lowest data transmission price, and the like.

As a third step, the end-point terminal determines whether or not to change a connection path S320. Change of a connection path is determined based on a command inputted by a user through the input unit.

As a fourth step, if it is determined to change a connection path, the end-point terminal releases current connection and changes the connection path to a mobile communication terminal corresponding to the recommended connection path S330.

As a fifth step, if it is determined not to change a connection path, the end-point terminal maintains current connection.

On the other hand, the method for connecting to an efficient connection path by an end-point terminal may be stored in a storage medium as a program.

Hereinafter, an application example of the present invention is described.

As a first step, an end-point terminal is connected to a service server through a first mobile communication terminal. At this point, it is assumed that the first mobile communication terminal will be initially connected to the end-point terminal.

As a second step, the service server determines a mobile communication terminal having optimum connection efficiency and a mobile communication terminal having the lowest data transmission price among all mobile communication terminals (first to third mobile communication terminals) connectible to the end-point terminal. In this embodiment, it is assumed that the second mobile communication terminal has optimum connection efficiency and the third mobile communication terminal has the lowest data transmission price.

As a third step, the service server transmits a result of the determination to the end-point terminal.

As a fourth step, a user confirms the result of the determination through the display unit of the end-point terminal, and releases connection to the first mobile communication terminal and handles the end-point terminal to connect to the second mobile communication terminal in order to use the contents that need optimum connection efficiency.

a fifth step, the service server approves connection between the end-point terminal and the mobile communication terminal and requests the application server to provide the end-point terminal with the contents.

As a sixth step, the end-point terminal receives the contents. At this point, the billing server confirms reception of the contents and performs a billing process for the second mobile communication terminal.

As a seventh step, in order to use the contents that require the lowest data transmission price, the user handles the end-point terminal to release the connection to the first mobile communication terminal and connect to the third mobile communication terminal.

As an eighth step, the service server approves connection between the end-point terminal and the third mobile communication terminal and requests the application server to provide the end-point terminal with the contents.

As a ninth step, the end-point terminal receives the contents. At this point, the billing server confirms reception of the contents and performs a billing process for the third mobile communication terminal.

Embodiments of the present invention have been described above with reference to the accompanying drawings.

According to the present invention, a service server recommends a mobile communication terminal having an optimum connection quality and/or a mobile communication terminal having the lowest data transmission price among all mobile communication terminals connectible to an end-point terminal, and thus there is provided a technique for connecting the end-point terminal to a relevant mobile communication terminal to a user's taste.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A service server for recommending an efficient connection path, the service server comprising:
   a communication unit for transmitting and receiving data through a mobile communication network;
   a mobile communication terminal management unit for managing information on a mobile communication terminal received through the communication unit;
   an end-point terminal management unit for managing information on an end-point terminal received through the communication unit;
   a short-range communication network management unit for managing information on a short-range communication network that relays communications between the mobile communication terminal and the end-point terminal;
   a storage unit for storing the mobile communication terminal information, the end-point terminal information, the short-range communication network information, and a connection history between the end-point terminal and the mobile communication terminal, with the connection history including information on the processing speed of a control unit of the mobile communication terminal, an occupancy rate of the control unit of the mobile communication terminal for the connection between the end-point terminal and the service server, a data transfer speed between the end-point terminal and the service server, and a data transfer failure rate between the end-point terminal and the service server; and
   a control unit for controlling operations of each constitutional component, recommending a mobile communication terminal having an optimum connection quality and having a lowest data transmission price from among all mobile communication terminals currently connectible to the end-point terminal and informing the end-point terminal of the recommended mobile communication terminal through the communication unit, and controlling the communication unit to transfer contents received from an application server to the mobile communication terminal.

2. The service server according to claim 1, wherein the connection history further includes a data transmission price.

3. The service server according to claim 1, wherein the control unit recommends a mobile communication terminal having an optimum connection quality by comparing a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

4. The service server according to claim 3, wherein the control unit compares the data by assigning a weighting factor to each of the data.

5. A method for recommending an efficient connection path, performed by a system in which an end-point terminal can be connected to a plurality of mobile communication terminals through a short-range communication network, and the mobile communication terminals can be connected to a service server through a mobile communication network, the method comprising the steps of:
   connecting to the service server through any one of the mobile communication terminals, by the end-point terminal;
   examining if there is a connection history between the end-point terminal and the mobile communication terminal, by the service server; and
   comparing connection qualities of a currently connected mobile communication terminal and mobile communication terminals having a connection history including information on the processing speed of a control unit of the mobile communication terminal, an occupancy rate of the control unit of the mobile communication terminal for the connection between the end-point terminal and the service server, a data transfer speed between the end-point terminal and the service server, and a data transfer failure rate between the end-point terminal and the service server, recommending a mobile communication terminal having an optimum connection quality and a mobile communication terminal having a lowest data transmission price from among all mobile communication terminals currently connectible to the end-point terminal, and notifying the end-point terminal of the recommended mobile communication terminal, by the service server, if there is a connection history in the examination of connection history.

6. The method according to claim 5, wherein comparing connection qualities is comparing data including a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

7. The method according to claim 6, wherein comparing connection qualities is comparing the data by assigning a weighting factor to each of the data.

8. The method according to claim 5, wherein comparing connection qualities is comparing data transmission prices.

9. The method according to claim 5, further comprising the steps of:
   when the mobile communication terminals have no connection history further examining if there is a mobile communication terminal connectible to the end-point terminal, other than the currently connected mobile communication terminal, by the service server; and
   moving a processing flow to the step of comparing connection qualities of the currently connected mobile communication terminal and mobile communication terminals having a connection history, recommending a mobile communication terminal having an optimum connection quality, and notifying the end-point terminal of the recommended mobile communication terminal, by the service server, if there is a connectible mobile communication terminal in the examination of connectible mobile communication terminal.

10. The method according to claim 9, further comprising the step of maintaining the current connection by the end-point terminal, if there is no connectible mobile communication terminal in the examination of connectible mobile communication terminal.

11. The method according to claim 5, further comprising the steps of:
 determining whether or not to connect to the mobile communication terminal recommended by the service server, by the end-point terminal;
 connecting to the recommended mobile communication terminal by the end-point terminal, if the end-point terminal determines to connect to the recommended mobile communication terminal in the determination; and
 storing a connection history by the service server.

12. The method according to claim 11, further comprising the step of:
 maintaining the current connection by the end-point terminal and storing a connection history, if the end-point terminal determines not to connect to the recommended mobile communication terminal in the determination.

13. A method for recommending an efficient connection path by a service server, the method comprising the steps of:
 connecting to the service server via a mobile communication terminal by an end-point terminal;
 examining if there is a connection history between the end-point terminal and the mobile communication terminal;
 fetching the connection history including information on the processing speed of a control unit of the mobile communication terminal, an occupancy rate of the control unit of the mobile communication terminal for the connection between the end-point terminal and the service server, a data transfer speed between the end-point terminal and the service server, and a data transfer failure rate between the end-point terminal and the service server; and
 comparing connection qualities of mobile communication terminals having a connection history among mobile communication terminals connectible to the end-point terminal, recommending a mobile communication terminal having an optimum connection quality and a mobile communication terminal having a lowest data transmission price from among all mobile communication terminals currently connectible to the end-point terminal, and notifying the end-point terminal of the recommended mobile communication terminal.

14. The method according to claim 13, wherein comparing connection qualities is comparing data including a processing speed of a control unit of the mobile communication terminal, an occupancy rate of the control unit of the mobile communication terminal used by the control unit of the mobile communication terminal for the connection between the end-point terminal and the service server, a data transfer speed between the end-point terminal and the service server, and a data transfer failure rate between the end-point terminal and the service server.

15. The method according to claim 14, wherein comparing connection qualities is comparing the data by assigning a weighting factor to each of the data.

16. A non-transitory storage medium according to claim 15, for storing the method for recommending an efficient connection by a service server as a program.

17. The method according to claim 14, wherein comparing connection qualities is comparing data transmission prices.

18. The method according to claim 14, further comprising the steps of:
 when the mobile communication terminals have no connection history further examining if there is a mobile communication terminal connectible to the end-point terminal, other than a currently connected mobile communication terminal; and
 moving a processing flow to the step of comparing connection qualities of the currently connected mobile communication terminal and mobile communication terminals having a connection history, recommending a mobile communication terminal having an optimum connection quality, and notifying the end-point terminal of the recommended mobile communication terminal, if there is a connectible mobile communication terminal in the examination of connectible mobile communication terminal.

19. The method according to claim 18, further comprising the step of maintaining the current connection by the end-point terminal, if there is no connectible mobile communication terminal in the examination of connectible mobile communication terminal.

20. A non-transitory storage medium according to claim 19, for storing the method for recommending an efficient connection by a service server as a program.

21. A non-transitory storage medium according to claim 18, for storing the method for recommending an efficient connection by a service server as a program.

22. The method according to claim 14, further comprising the steps of:
 determining whether or not to connect to the mobile communication terminal recommended by the service server, by the end-point terminal;
 connecting to the recommended mobile communication terminal by the end-point terminal, if the end-point terminal determines to connect to the recommended mobile communication terminal in the determination; and
 storing a connection history by the service server.

23. The method according to claim 22, further comprising the step of:
 maintaining the current connection and storing a connection history by the end-point terminal, if the end-point terminal determines not to connect to the recommended mobile communication terminal in the determination.

24. A non-transitory storage medium according to claim 23, for storing the method for recommending an efficient connection by a service server as a program.

25. A non-transitory storage medium according to claim 22, for storing the method for recommending an efficient connection by a service server as a program.

26. A non-transitory storage medium according to claim 14, for storing the method for recommending an efficient connection by a service server as a program.

* * * * *